(12) United States Patent
Duquesne et al.

(10) Patent No.: US 12,096,719 B2
(45) Date of Patent: Sep. 24, 2024

(54) HEADER SECURING MECHANISM FOR A COMBINE HARVESTER

(71) Applicant: CNH Industrial America LLC, New Holland, PA (US)

(72) Inventors: Frank R. G. Duquesne, Zwevegem (BE); Dré W. J. Jongmans, AG Klundert (NL); Bart M. A. Missotten, Herent (BE); Sam Reubens, Sint-Michiels (BE); Frederik Tallir, Esen (BE); Pieter Van Overschelde, Sint-Andries (BE)

(73) Assignee: CNH Industrial America LLC, New Holland, PA (US)

( * ) Notice: Subject to any disclaimer, the term of this patent is extended or adjusted under 35 U.S.C. 154(b) by 636 days.

(21) Appl. No.: 17/415,116

(22) PCT Filed: Dec. 17, 2019

(86) PCT No.: PCT/EP2019/085584
§ 371 (c)(1),
(2) Date: Jun. 17, 2021

(87) PCT Pub. No.: WO2020/127217
PCT Pub. Date: Jun. 25, 2020

(65) Prior Publication Data
US 2022/0053695 A1 Feb. 24, 2022

(30) Foreign Application Priority Data
Dec. 18, 2018 (EP) ..................................... 18213677

(51) Int. Cl.
*A01D 41/16* (2006.01)
*A01B 59/06* (2006.01)

(52) U.S. Cl.
CPC ............ *A01D 41/16* (2013.01); *A01B 59/064* (2013.01)

(58) Field of Classification Search
CPC ..... A01D 41/16; A01D 41/145; A01B 59/064
See application file for complete search history.

(56) References Cited

U.S. PATENT DOCUMENTS 3,172,686 A * 3/1965 Beard .................. A01B 59/062
280/504
3,412,534 A * 11/1968 Teale ..................... A01D 61/00
56/2

(Continued)

FOREIGN PATENT DOCUMENTS

BE 1030244 A1 * 8/2023 ............. A01D 41/16
DE 102013110688 A1 3/2015

(Continued)

OTHER PUBLICATIONS

International Search Report and Written Opinion for International Application No. PCT/EP2019/085584, dated Mar. 20, 2020, 10 pages.

(Continued)

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

In a combine harvester, the header is lifted up by the feeder and secured thereto by a mechanism including a pair of securing pins on the feeder's carrier structure. The securing pins are provided with stops protruding towards the header and which include a sloped surface, configured to interact with positioning aids on the header. The lateral outward or inward movement of the securing pins is driven by a centrally placed actuator. As the actuator is extended, the positioning aids roll or glide down the sloped surfaces, enabling a gradual approach of the header towards the (Continued)

feeder, up to a point where the securing pins become aligned with slots on the header. Continued actuation of the pin motion then establishes the securing of the header to the feeder.

8 Claims, 4 Drawing Sheets

(56) References Cited

U.S. PATENT DOCUMENTS

| | | | | |
|---|---|---|---|---|
| 3,488,930 | A * | 1/1970 | Feldmann | A01D 41/16 |
| | | | | 56/12.9 |
| 3,559,384 | A | 2/1971 | Bernhardt et al. | |
| 4,280,317 | A | 7/1981 | Lindblom et al. | |
| 4,677,814 | A | 7/1987 | Anderson et al. | |
| 7,497,459 | B2 * | 3/2009 | Johnson | A01D 41/16 |
| | | | | 280/515 |
| 9,723,785 | B2 * | 8/2017 | Ritter | A01D 41/16 |
| 11,172,614 | B2 * | 11/2021 | Noll | A01B 59/062 |
| 11,744,181 | B2 * | 9/2023 | Carpenedo | A01D 41/06 |
| | | | | 56/122 |
| 2003/0172637 | A1 * | 9/2003 | Watts | A01D 41/16 |
| | | | | 56/14.7 |
| 2010/0011729 | A1 | 1/2010 | Salley et al. | |
| 2013/0192187 | A1 * | 8/2013 | Boyd, III | A01D 75/28 |
| | | | | 56/153 |
| 2016/0057930 | A1 | 3/2016 | Ritter | |
| 2016/0057934 | A1 | 3/2016 | Dreer et al. | |
| 2016/0165796 | A1 | 6/2016 | Carpenedo | |
| 2018/0255707 | A1 * | 9/2018 | Solimar Walter | E02F 3/3604 |

FOREIGN PATENT DOCUMENTS

| | | | | |
|---|---|---|---|---|
| EP | 1987713 | A1 | 11/2008 | |
| EP | 2989881 | A1 | 3/2016 | |
| SU | 1386088 | A1 * | 4/1988 | A01D 41/12 |
| WO | 2011095525 | A1 | 8/2011 | |
| WO | 2011161143 | A1 | 12/2011 | |

OTHER PUBLICATIONS

Extended European Search Report for European Application No. 18213677.0, dated Aug. 1, 2019, 4 pages.

* cited by examiner

HEADER SECURING MECHANISM FOR A COMBINE HARVESTER

CROSS-REFERENCE TO RELATED APPLICATIONS

This application is a U.S. national phase application filed under 35 U.S.C. § 371, claiming benefit to International Patent Application No. PCT/EP2019/085584, filed Dec. 17, 2019, which is related to, and claims the benefit of priority from, European Patent Application No. 18213677.0, filed Dec. 18, 2018, the contents of each of which are incorporated herein by reference in their entirety for all purposes.

FIELD OF THE INVENTION

The present invention is related to combine harvesters, in particular to a mechanism for securing a combine header to a carrier structure at the front of the harvester.

BACKGROUND OF THE INVENTION

Agricultural combine harvesters are machines designed for harvesting and processing crops such as wheat or corn. Crops are cut from the field on a wide area by the header mounted at the front of the combine. By an auger or a belt system included in the header, the harvested material is brought to a central area of the header, and from there it is transported by a transportation section known as the feeder of the combine, to a threshing mechanism comprising laterally or longitudinally mounted threshing rotors and further to the cleaning section comprising a number of sieves where grains are separated from any remaining crop residue.

In many existing combine harvesters, the coupling of a header to the feeder of the combine is an operation involving a number of steps, several of which require manual intervention by the combine operator. To establish an initial connection, the header is positioned on the ground or on a dedicated trailer and the operator drives the combine up to the header, first lowering the feeder and then lifting it up by a hydraulic lifting system, until an interlocking contact is established between a carrier structure on the feeder and an interlocking beam on the header. The feeder then further lifts up the header until the rear face of the header rests against the front face of the feeder. At that point, the operator needs to manually secure the header by a suitable locking mechanism, e.g. by rotating a hook located at the underside of the feeder until it grabs a pin or bar located at the rear face of the header. After that, the operator manually connects the drive shaft of the header to the drive shaft of the feeder. Also, electrical cables and hydraulic lines on the header and the feeder respectively must be connected manually. Such manual operations are often impractical, time consuming and unsafe.

In answer to these problems, automatic securing systems have been developed. These systems however often involve important impact forces between parts of the header and the feeder, making it difficult to combine the act of securing the header with the interconnection of fragile components, such as the parts of an electric and/or hydraulic multicoupler. WO-A-2011161143 discloses a system wherein a rotatable hook on the feeder is secured to a pin on the header without manual intervention of the operator. Interconnection of multicoupler parts on the header and the feeder is established by gradually lowering the distance between the header and the feeder. While providing an adequate solution to the disadvantages of manual coupling and realising a gradual coupling compatible with the presence of a multi-coupler, it has been found that especially in the upward direction, the hook mechanism provides insufficient security when applied to the ever increasing size of the headers and combines which are being developed today.

An automatic coupling system is therefore required that establishes a gradual securing sequence combined with a stronger connection between the header and the feeder.

SUMMARY OF THE INVENTION

The present invention is related to a combine harvester in accordance with the appended claims. In a combine harvester according to the invention, the header is lifted up by a carrier structure at the front of the feeder and secured thereto by a mechanism comprising a pair of securing pins on the carrier structure, configured to move laterally into slots on the header. The lateral outward or inward movement of the securing pins is driven by anactuator coupled to the pins and preferably located between the pins. The securing pins are provided with stops protruding towards the header and which comprise a sloped surface, configured to interact with positioning aids such as rollers or studs on the header. The positioning aids and the stops are placed so that the rollers or studs are initially (i.e. when the header is first lifted up from the ground or a trailer) in contact with an upper portion of the slanted surfaces, when the actuator is in a retracted state. As the actuator is extended, the movement of the rollers or studs relative to the sloped surfaces enables a gradual approach of the header towards the feeder, up to a point where the securing pins become aligned with the slots on the header. Continued actuation of the pin motion then drives the pins into the slots, thereby securing the header to the feeder. According to a preferred embodiment, at least the inward movement of the stops is limited in such a manner that a predefined, preferably central position of the stops is attained when the securing pins are retracted. This may be realised by guiding each of the pins between an inner and outer bushing, the inner bushings serving as boundaries for the inward movement of the stops.

The lateral securing represents an improvement in terms of the strength of the connection of the header to the feeder, especially with regard to upward or downward relative forces between header and feeder. The gradual approach is beneficial in that the securing sequence does not involve large impact forces between the header and the feeder. The mechanism is thereby compatible with the presence of fragile interacting parts on the header and the feeder, such as the parts of an electric and/or hydraulic multicoupler.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims. The terms 'front' and 'back' or 'rear' are referenced to the front and back side of the combine harvester. The 'forward direction' of the combine harvester refers not to a single geometrical axis but to the general direction from the rear of the vehicle to the front.

Figure 1:
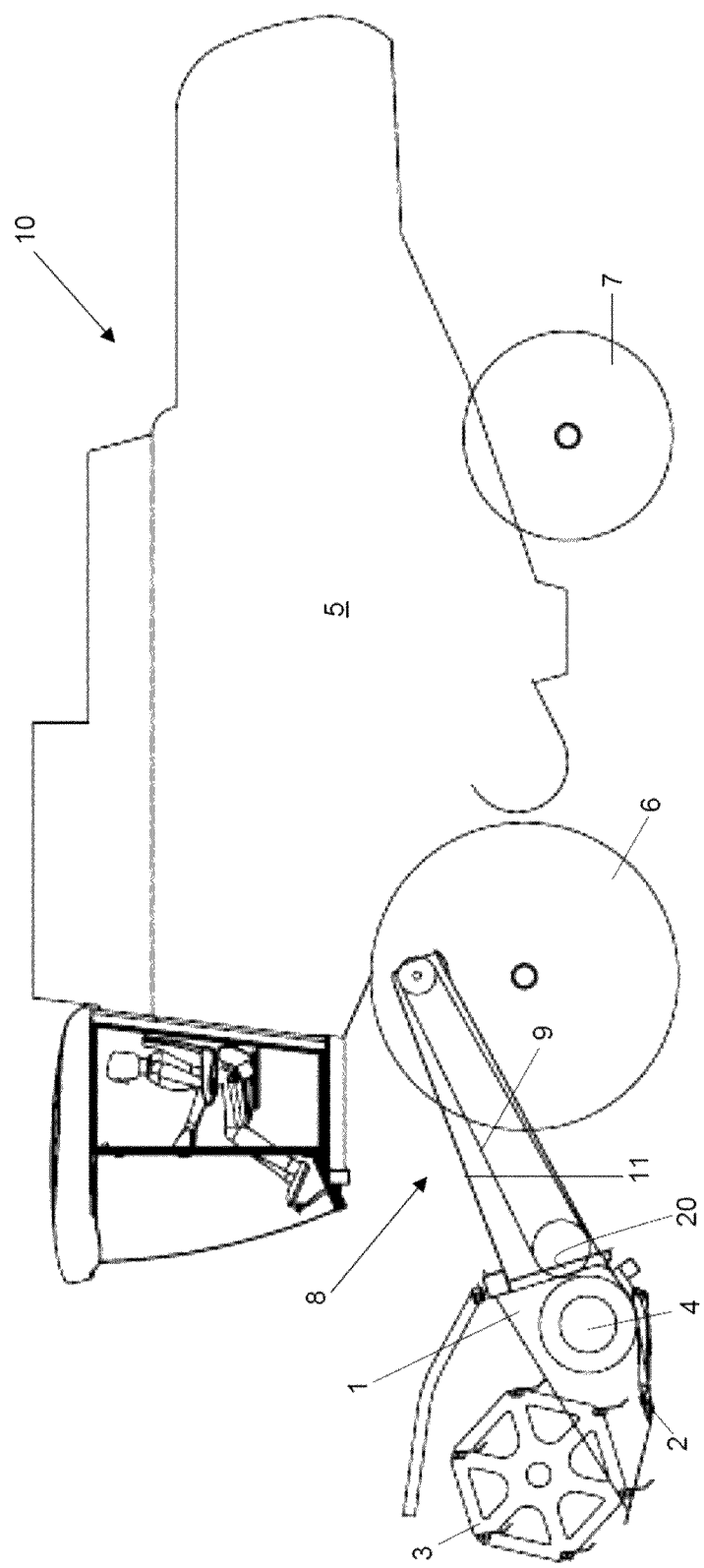
FIG. 1 is a schematic side view of a combine header as known in the art, indicating the position of the header and the feeder at the front of the machine.

FIG. 1 is a schematic image of a combine harvester 10 as known today, comprising a header 1 mounted at the front of the combine. The header comprises knives 2 maintained at a given height above ground level while the combine moves through a field of crops that are to be harvested. A rotating reel 3 guides the crops towards the knives. Cut crops are transported from both lateral sides of the header towards a central area by an auger 4. The main body 5 of the combine is supported by front and rear wheels 6 and 7 and comprises the threshing rotors and cleaning section generally known by the skilled reader and not depicted as such in FIG. 1. From the central area of the header 1, crops are transported into the main body 5 of the combine by a feeder 8. The feeder 8 is inclined upwards from the header 1 towards the main body 5 and comprises moving belts 9 inside a housing 11. The belts transport the crops upwards, from an inlet section of the feeder to an outlet section. At the front, the feeder comprises a cradle frame 20, onto which the header 1 is mounted and secured. In the context of the present specification, the cradle frame 20 is regarded as a part of the feeder's carrier structure to which the header 1 is removably attached.

Figure 2:
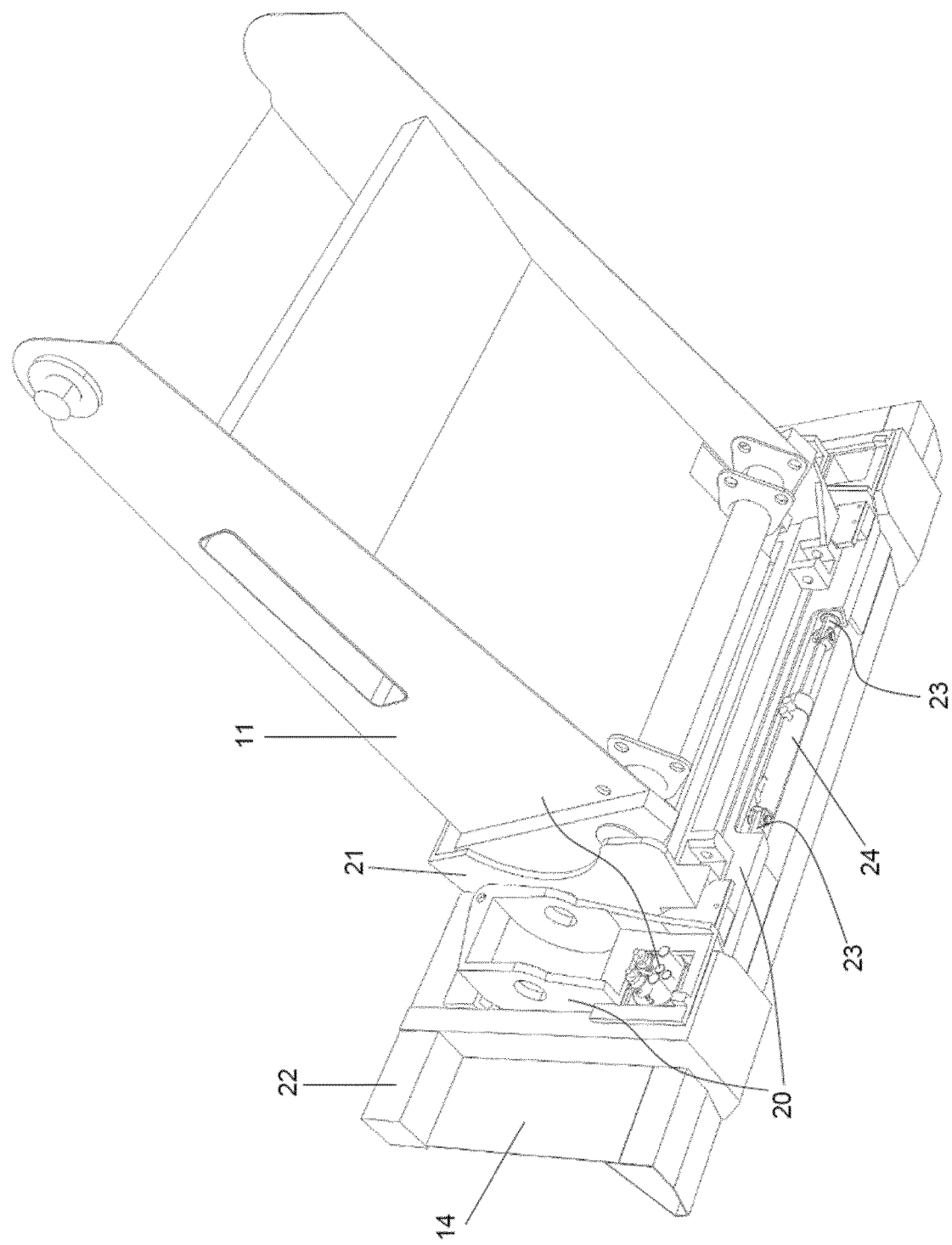
FIG. 2 illustrates a header securing mechanism in accordance with an embodiment of the invention.

FIG. 2 shows the feeder housing 11 of a combine and a header frame 14 secured to the feeder by a securing mechanism in accordance with a preferred embodiment of the invention. The header frame 14 is the part of the header that is directly attached to the feeder. In the particular case illustrated in FIG. 2, the feeder's carrier structure comprises a cradle frame 20 fixedly attached at the front of a movable adapter plate 21 configured to be able to undergo at least an upward or downward tilting movement relative to the feeder housing 11. This movement is however not required for the coupling mechanism of the invention. The invention is applicable also when the cradle frame 20 is immovably attached to the feeder housing 11.

The initial approach of the combine towards the header positioned on the ground or on a trailer takes place in the manner described in the introductory portion. The combine is driven up to the header until a cradle portion at the top of the cradle frame 20 engages with an interlocking beam 22 on the header. The feeder is then hydraulically lifted up, so that the header becomes suspended and rests against the front face of the cradle frame. In the preferred case shown in the drawings, the geometry of the header and the feeder is configured so that the header is pressed against the front surface of the cradle frame 20 under the influence of no other force than its own weight. The securing of the header to the cradle frame takes place by laterally extending pins 23, operated by a variable length actuator 24 mounted on the cradle frame 20 and oriented transversely with respect to the combine's forward direction. The pins are secured in slots provided in the header frame 14. The automatic securing of the header frame 14 to the feeder's carrier structure 20,21 takes place gradually through the interaction of sloped surfaces on the pins 23 and positioning aids, preferably studs or rollers, on the header.

Figure 3:
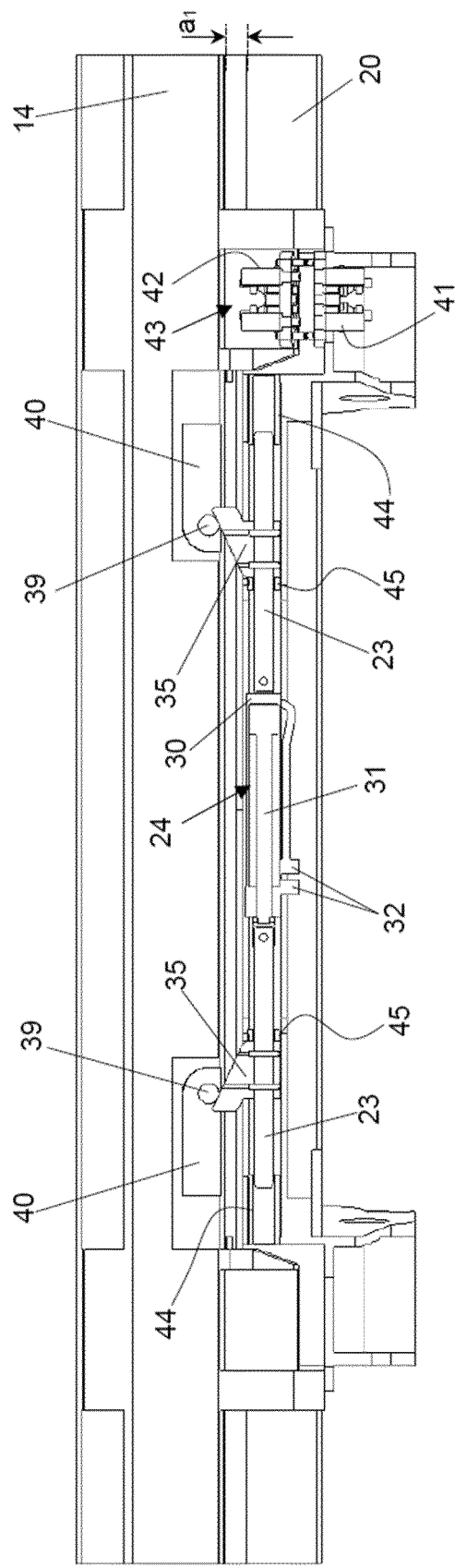
FIGS. 3 to 6 show various stages of the header securing sequence, in the case of the embodiment of FIG. 2.

This is illustrated in FIGS. 3 to 6 which show four consecutive stages of the securing sequence, as seen in a top cross-section view through the central axis of the variable length actuator 24. FIG. 3 shows the situation when the header has been picked up by the hydraulically lifted feeder. At the height of the actuator 24, the header frame 14 is separated from the front surface of the cradle frame 20 by a distance '$a_1$'. The variable length actuator 24 is fully retracted. In the depicted embodiment, this actuator is a hydraulic actuator comprising a cylinder 30 and a piston 31. A hydraulic circuit is coupled to the cylinder through ports 32 to which tubes (not shown) are connected. Both the cylinder 30 and the piston 31 are moveable relative to the cradle frame 20. The two securing pins 23 are coupled respectively to the cylinder 30 and the piston 31. In a central section of each pin, a stop 35 is fixedly connected to the pin and extending outward from the pin in the forward direction of the harvester. The front surfaces of the stops 35 are sloped with respect to the pins 23. The slope of the surfaces is directed downwards in the direction of the actuator 24.

Each of the pins 23 is guided by two bushings 44 and 45 on both sides of the actuator 24, while the actuator 24 is suspended from the pins 23, i.e. the actuator is movable laterally between the inner bushings 45. The bushings 44 and 45 are symmetrically placed with respect to the longitudinal centre plane of the feeder. Besides the guiding of the pins, these bushings have the function of defining the boundaries of the lateral path of the pins 23, through the interaction between the bushings 44,45 and the stops 35. In the fully retracted state of the actuator shown in FIG. 3, the stops 35 are drawn against the inner bushings 45, thereby establishing an automatic centering of the actuator 24 so that the stops 35 are in a pre-defined central position.

On the header frame 14, a pair of cylindrical rollers 39 is provided. The rollers are placed in respective recesses 40. The rollers are located relative to the stops 35 so that when the header is first suspended from the feeder after the initial pick-up, with the actuator 24 in the retracted state as shown in FIG. 3, the rollers 39 lie against an upper region of the sloped surfaces of the stops 35 which are in the auto-centred position, in contact with the inner bushings 45 as described above. This relative position of the rollers 39 with respect to the stops 35 thereby defines the initial distance $a_1$ between the header frame 14 and the cradle frame 20.

Also visible in FIG. 3 are the two halves 41 and 42 of a multicoupler 43. This is a mechanism known per se in the art, for interconnecting electrical and/or hydraulic or other supply lines from the feeder to the header. One half 41 of the multicoupler is mounted on the cradle frame 20, the other half 42 is mounted on the header frame 14. The two halves face each other in the state shown in FIG. 3 and are configured to become interconnected by the subsequent stages of the securing sequence. The coupling halves 41 and 42 may be provided with guiding pins for aligning the halves as they approach each other.

Figure 4:
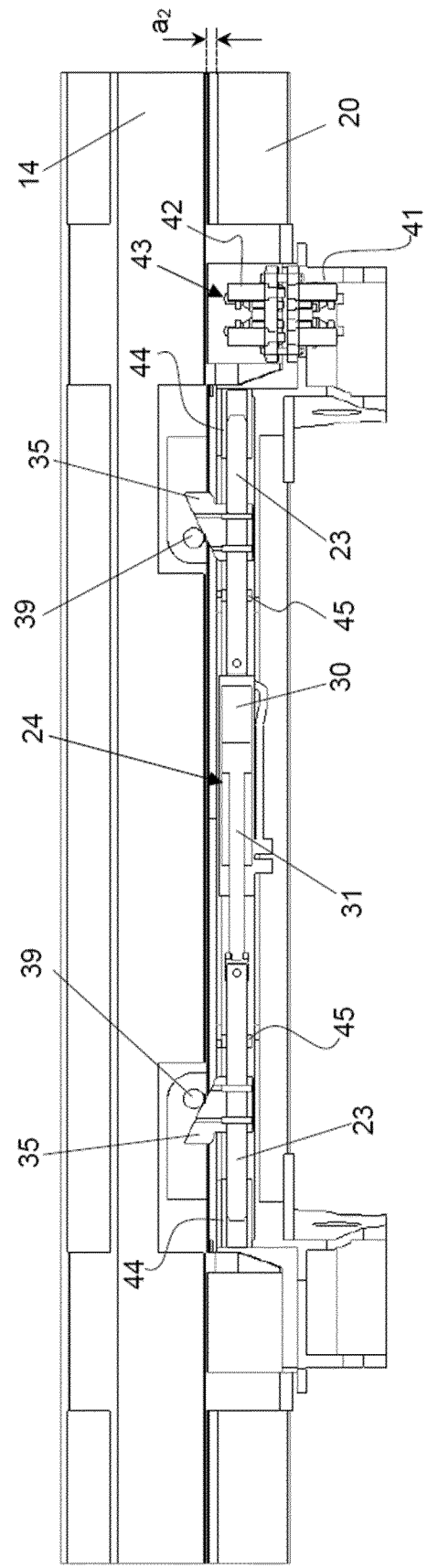

The securing sequence continues by extending the actuator 24, see FIG. 4. The securing pins 23 are guided to move along their own longitudinal axis, relative to the cradle frame, by the bushings 44 and 45. Through the activation of the actuator 24, the cylinder 30 and the piston 31, and thereby the first and second pin 23, are pushed apart, and the outer ends of the pins 23 are further inserted into the outer bushings 44. The rollers 39 roll down the sloped surfaces of the outwardly moving stops 35, enabling the gradual approach of the header 14 frame towards the cradle frame 20, under the influence of the gravity force acting on the header frame 14. The gradual approach is additionally enabled by the recesses 40 which allow the free lateral movement of the stops 35 as the distance between the header frame 14 and the cradle frame 20 decreases. In the state shown in FIG. 4, this distance has decreased to $a_2$. The two halves 41 and 42 of the multicoupler 43 have also approached each other and are on the verge of interlocking. The actuator 24 is then further extended and the gradual approach of the header frame 14 towards the cradle frame 20 continues. As the actuator is suspended from the bushings 44 and 45, it may adjust it's lateral position to a possible misalignment between the cradle frame and the header, during the outward movement of the stops 35 between the inner and outer bushings 45 and 44.

Figure 5:
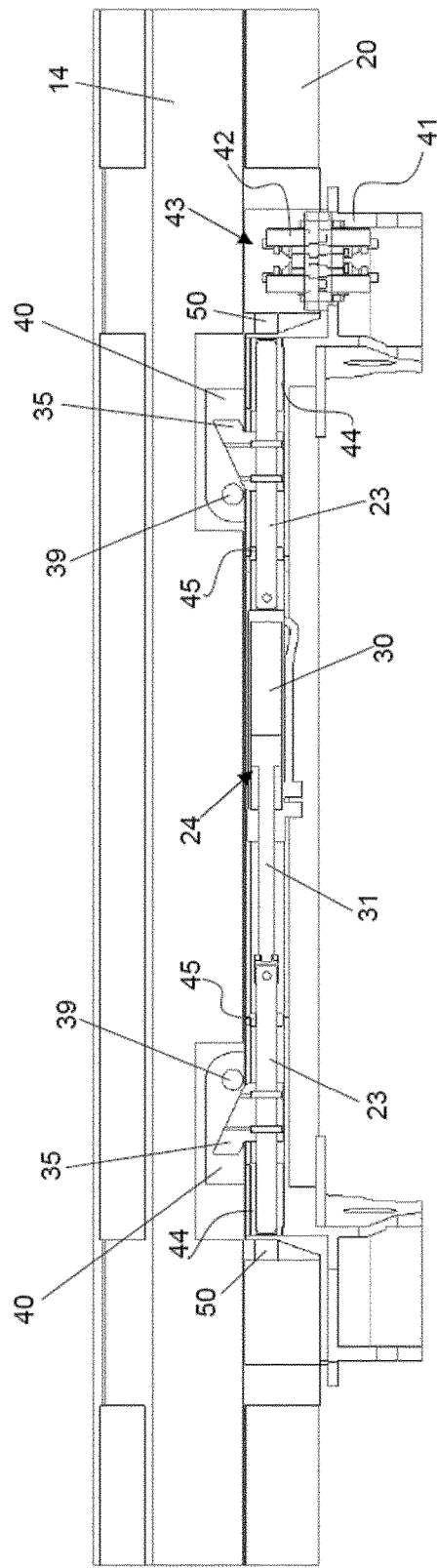

In the state shown in FIG. 5, the distance between the header frame 14 and the cradle frame 20 is effectively bridged, i.e. the header frame 14 is lying against the front surface of the cradle frame 20. The rollers 39 have reached the end of the sloped surfaces on the stops 35. During this latter part of the sequence, the active interconnection between the multicoupler halves 41 and 42 is effectively established. Thanks to the interaction of the sloped surfaces on the cradle frame 20 and the rollers 39 on the header frame 14, this is achieved in a gradual manner, ensuring that the multicoupler halves 41 and 42 do not become damaged.

Figure 6:
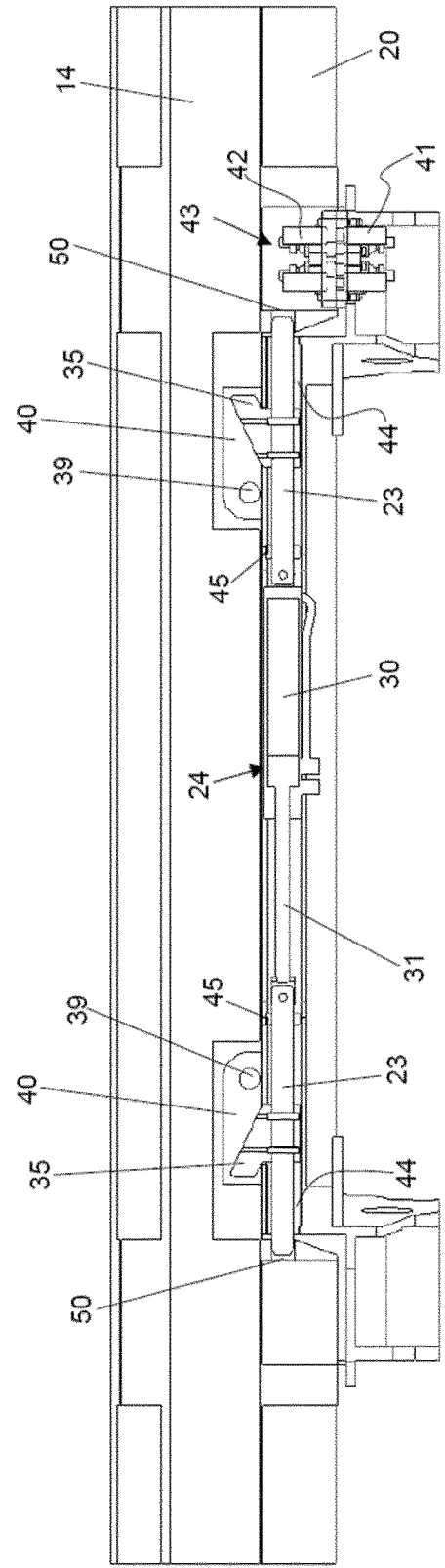

In the state shown in FIG. 5, the securing pins 23 have continued their course inside the outer bushings 44, to the point where the pins have become aligned with corresponding slots 50 in the header frame 14. As shown in FIG. 6, the continued extension of the actuator 24 pushes the pins 23 into these slots 50. The outward movement of the pins 23 continues until both stops 35 are in contact with the outer bushings 44, thereby completing the securing sequence. In this position, the pins 23 are fully secured in the slots 50. The bushings 44 act as boundaries for the stops 35, thereby forcing the actuator 24 into the central position when the stops 35 are in contact with these bushings 44.

In order to release the header, the actuator 24 is retracted until the pins 23 are extracted from the slots 50 and the stops 35 are again drawn inwards until they are in contact with the inner bushings 45. At that point the header may be placed on the ground or on a trailer and the feeder may be hydraulically lowered, so as to release the connection between the header's interlocking beam 22 and the cradle frame 20 of the feeder. The actuator 24 is fully retracted, so that the stops 35 are correctly placed in the auto-centered position of FIG. 3 for a subsequent header pick-up and securing sequence.

The invention is not limited to the embodiment shown in the drawings and a number of alternative features may be implemented without departing from the scope of the appended independent claim. The actuator 24 may be an electrical actuator or a spindle instead of a hydraulic actuator, or a hydraulic cylinder provided with two pistons could be used. Instead of rollers 39, studs or the like may be provided which glide relative to the sloped surfaces of the stops 35. The sloped surfaces of the stops 35 may have a different geometry, for example curved instead of straight. The mechanism is applicable also when the header frame 14 and the cradle frame 20 are not provided with halves of a multicoupler 43 which need to be automatically interconnected.

In the embodiment of FIGS. 3 to 6, the function of defining the outer boundary of the path of the pins 23 may be fulfilled by the bottom of the slots 50 or by a boundary inside the slots 50 in stead of by the outer bushings 44. Depending on the type of actuator used, an auto-centering function may be realized in other ways than by guiding the pins in a pair of bushings 44 and 45 on both sides of the actuator. For example when the actuator itself is placed in a fixed position on the feeder, with the pins moving outward from the actuator, the pins could be guided by the actuator itself and/or by a single bushing on each side of the actuator.

According to further alternatives, the gradual approach of the header to the feeder is not or not solely generated by the weight of the header, but this approach could be actuated or aided by an additional force, for example exerted by an additional hydraulic actuator. The mechanism could comprise additional pairs of securing pins 23, actuated by respective actuators, or multiple pairs of securing pins could be actuated by the same actuator.

The 'securing position' need not necessarily be a position wherein the rear face of the header frame 14 is in full contact with a front face of the cradle frame 20, but this position may be determined by the specific geometry of the header frame and the carrier structure to which it is attached.

The invention claimed is:

1. A combine harvester comprising a feeder and a detachable header, the feeder comprising a carrier structure for lifting up the header from the ground or from a trailer, wherein:
   the carrier structure comprises a pair of securing pins oriented transversely relative to the forward direction of the combine, and an actuator located between the pins and configured to move the pins towards or away from each other while the pins maintain their transverse orientation,
   immovably attached to each securing pin is at least one stop protruding outward from the pin in the forward direction, the stops having a front surface that is sloped relative to the respective pins,
   the header comprises a positioning aid for each of the stops, and a pair of slots configured to receive the ends of the securing pins, and wherein:
   the positioning aids are placed relative to the sloped surfaces of the respective stops in such a manner that after the header is lifted up by the carrier structure, the positioning aids are configured to roll or glide down the sloped surfaces under the influence of the actuator moving the securing pins away from each other, thereby enabling a gradual approach of the header towards a securing position relative to the carrier structure,
   the slots on the header are placed so that when the header reaches said securing position, the pins are aligned with the slots, so that the continued actuation of the outward movement of the pins by the actuator drives the ends of the securing pins into the slots, thereby securing the header to the carrier structure.

2. The combine harvester according to claim 1, wherein the header and the carrier structure respectively comprise a first and a second half of a multicoupler, placed in such a manner on the header and the carrier structure that the two halves are interconnected at the end of the gradual approach of the header towards the securing position.

3. The combine header according to claim 1, wherein the header and the carrier structure are configured so that the gradual approach is generated by the gravity force acting on the header.

4. The combine harvester according to claim 1, wherein the actuator, the securing pins and the stops are configured so that prior to lifting up the header, the actuator is able to retract the securing pins towards each other until the stops reach a pre-defined central starting position.

5. The combine harvester according to claim 4, wherein each securing pin is guided by two bushings, an inner bushing and an outer bushing, the actuator being movable between the inner bushings, and wherein the inner bushings serve as boundaries for the inward movement of the stops.

6. The combine harvester according to claim 5, wherein the outer bushings serve as boundaries for the outward movement of the stops, thereby defining the position of the actuator when the pins are fully secured in the slots.

7. The combine harvester according to claim 1, wherein the actuator is a variable length actuator comprising a first and second movable portion, and wherein the securing pins are connected respectively to the two portions of the actuator.

8. The combine harvester according to claim 1, wherein the positioning aids are rollers configured to roll on the sloped surfaces of the stops.

* * * * *